(12) United States Patent
Silverbrook

(10) Patent No.: US 6,688,528 B2
(45) Date of Patent: Feb. 10, 2004

(54) COMPACT DISPLAY ASSEMBLY

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 117 days.

(21) Appl. No.: 10/066,621

(22) Filed: Feb. 6, 2002

(65) Prior Publication Data

US 2002/0071066 A1 Jun. 13, 2002

Related U.S. Application Data

(63) Continuation-in-part of application No. 09/112,781, filed on Jul. 10, 1998.

(30) Foreign Application Priority Data

Jul. 15, 1997 (AU) ................................................ PO7991
Mar. 16, 1998 (AU) ................................................ PP2370

(51) Int. Cl.[7] ................................................ G06K 7/10
(52) U.S. Cl. ............................ 235/472.01; 235/462.13; 235/462.45

(58) Field of Search ........................ 735/462.45, 462.46, 735/462.47, 462.13, 472.01, 472.02, 472.03

(56) References Cited

U.S. PATENT DOCUMENTS 5,825,947 A  10/1998  Sasaki et al.
6,107,988 A  *  8/2000  Phillipps .................... 345/156

* cited by examiner

*Primary Examiner*—Karl D. Frech

(57) ABSTRACT

A compact display assembly includes a flexible display screen such as a passive LCD screen or an OLED display screen. Printed circuit boards including driving circuitry for the display screen are mounted at its rear in a configuration defining a longitudinal region of the screen about which it may be folded or curved over on itself to a compact configuration. The assembly may be included in electronic computational devices such as laptop computers, electronic books and the like.

6 Claims, 4 Drawing Sheets

COMPACT DISPLAY ASSEMBLY

CROSS REFERENCE TO RELATED APPLICATION

The present application is a continuation in part of and claims the benefit of U.S. application Ser. No. 09/112,781 filed on Jul. 10, 1998, the entire contents of which are herein incorporated by reference.

BACKGROUND OF THE INVENTION

1. Field of the Invention

The present invention relates to a compact display assembly. In a particular embodiment the invention relates to a display assembly incorporating a liquid crystal display (LCD) though other displays, such as an organic light emitting diode (OLED) display might also be used.

2. Description of Related Art

It is now possible to obtain LCD devices having substrates made of a flexible plate, for example a plastic film. Such devices may be mounted on non-planar surfaces. One such LCD is described in U.S. Pat. No. 4,674,840 to Bennett. More recently, another flexible LCD device has been described in U.S. Pat. No. 6,204,902 to Kim et al.

Considerable research is presently being undertaken in relation to the development of OLED displays. OLED displays are made according to a multi-layer process by which an extremely thin polymer layer is sandwiched between two electrodes. A few layers of atoms from an indium-tin-oxide (ITO) transparent electric conductor are sputtered on transparent, flexible carrier films to form an anode. The anode is spin-coated with a very thin layer of electroluminiscent polymers. Centrifugal forces distribute the polymers, liquefied by solvents, in an absolutely uniform manner. In a final step a mechanically flexible cathode, being a combination of various metals, is sputtered on the component. The final product is flexible and less than 500 nm in thickness.

The manufacture of a display assembly which incorporates a flexible display poses a number of problems. One problem is that while the displays are flexible they will be damaged or their operation will be impaired if they are creased. Another difficulty is that although the display is flexible the associated driving circuitry is most readily mounted on rigid printed circuit boards. Accordingly a number of connections must be made between a flexible display and one or more rigid circuit boards which presents difficulties.

BRIEF SUMMARY OF THE INVENTION

It is an object of the present invention to provide a display assembly which incorporates a flexible display and which is arranged so that the display may be folded or curved over on itself without creasing.

Accordingly the present invention provides a display assembly that includes a flexible display screen that has a plurality of connection points. At least two printed circuit boards (PCBs) are located at the rear of the screen and define a longitudinal region of the screen therebetween. Flexible connectors are located between the connection points located in the longitudinal region and each of the PCBs. An edge of the screen and edges of the PCBs define triangles, wherein the flexible connectors are of sufficient length to accommodate closing of the assembly about the longitudinal region.

Preferably said edge of the screen and edges of the PCBs define right triangles with the flexible connectors terminating along hypotenuses of the triangles.

Preferably the printed circuit boards are shaped so that the sum of the lengths of the hypotenuses is equal to said length of the display screen.

The flexible connectors may terminate along edges of the printed circuit board defining the longitudinal region of the screen.

In a preferred embodiment the screen comprises a flexible liquid crystal display.

Alternatively the screen may comprise an organic light emitting diode display.

The display assembly may be incorporated into a computational device, for example a laptop computer or electronic book.

DETAILED DESCRIPTION OF THE PREFERRED EMBODIMENT

In order that members of the public may understand how the present invention may be put into practice a preferred embodiment of the invention will now be described.

Figure 1:
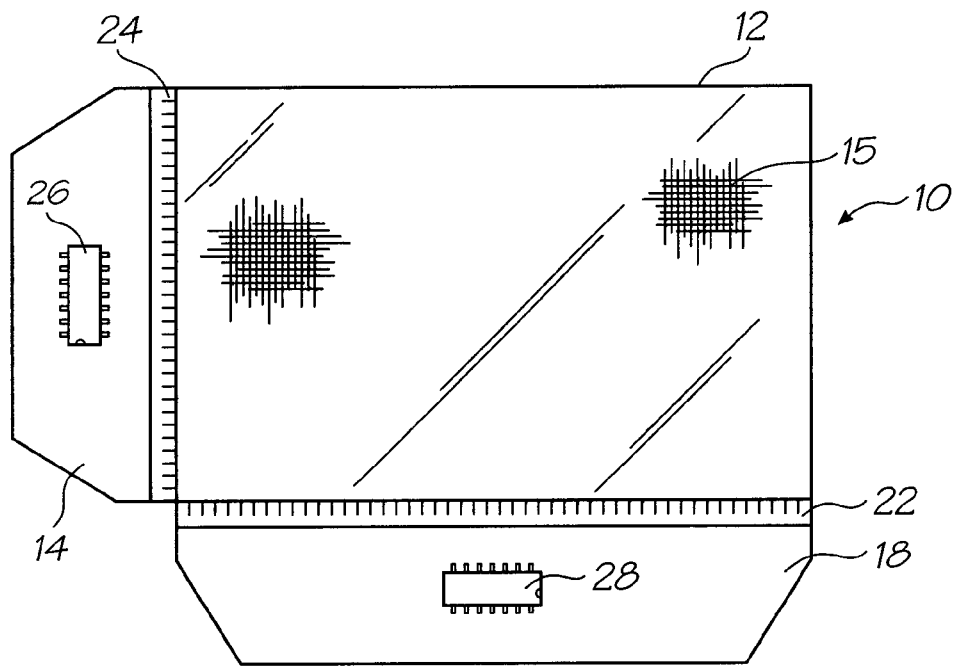
FIG. 1 is plan view of the front of a prior art display assembly.

A schematic view of a typical prior art passive matrix display assembly 10 is shown in FIG. 1. The liquid crystal display 12 is designed to display dot pattern images. A plurality of row and column electrodes are horizontally and vertically disposed across the liquid crystal display. Connection points for the electrodes are located along edges of the liquid crystal display.

Figure 2:
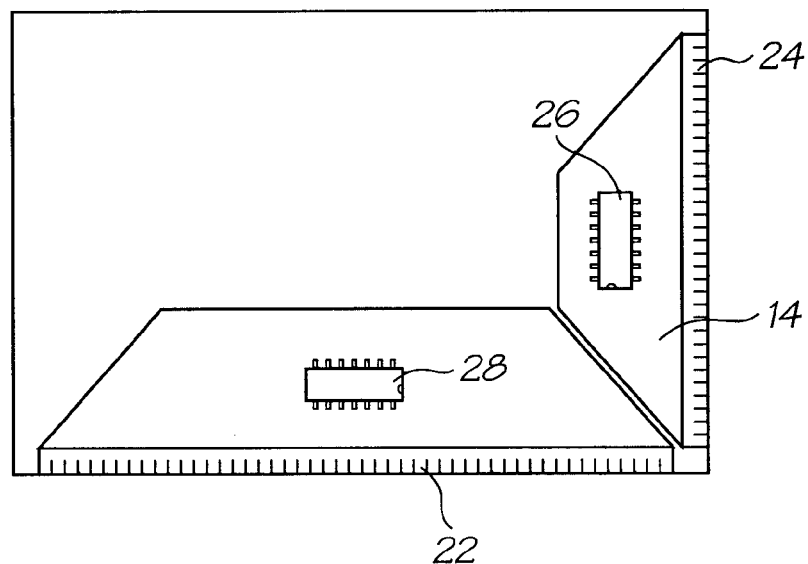
FIG. 2 is a plan view of the rear of a prior art display assembly.

Circuit boards 14 and 18 are coupled to the row and column electrodes of the LCD by means of tape automated bonding (TAB) films 22 and 24. PCB's 14 and 18 support circuitry including a row driver chip and column driver chip, 26 and 28 respectively, for applying potentials to selected row and column electrodes in order to selectively activate liquid crystal cells to form a display. For mounting in an apparatus such as a laptop computer or mobile phone the printed circuit boards 18 and 14 may be folded back behind the screen as shown in FIG. 2 which is a rear view of the display assembly. It will be realized that flexing of the LCD 12 would place a strain on the TAB connections 22, 24 to each of PCBs 14 and 18.

Figure 3:
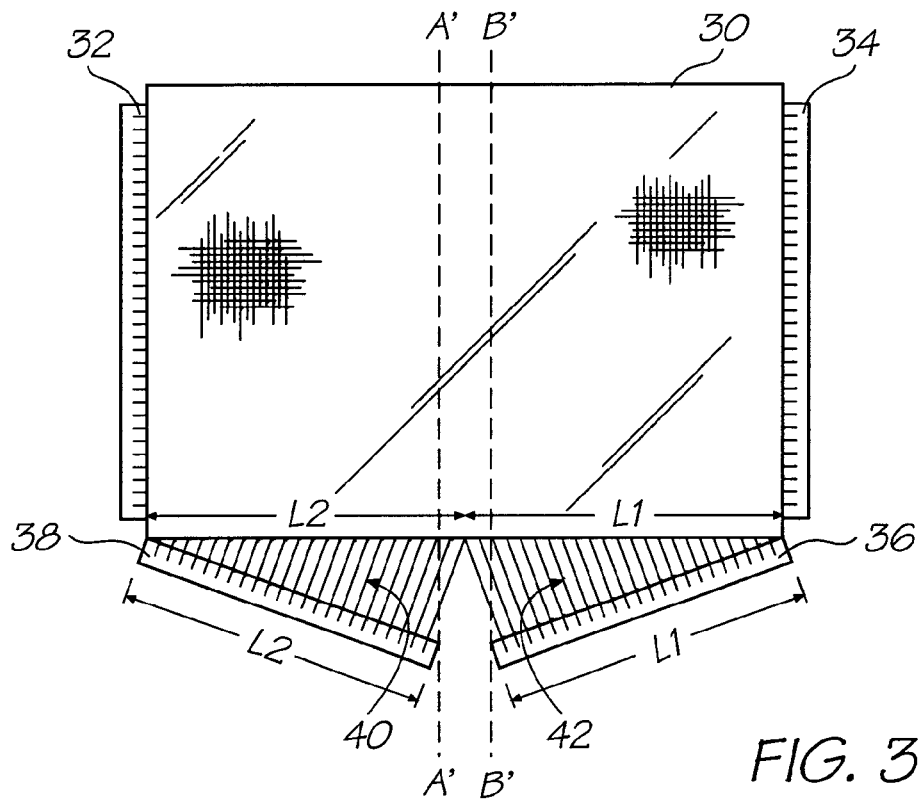
FIG. 3 is a plan view of the front of a display.

A preferred embodiment of the present invention will now be described with reference to FIG. 3. FIG. 3 depicts a flexible LCD screen 30 including TAB connections 32 and 34 for connecting to display row electrodes.

Beneath the lower edges of the flexible LCD 30 there are located two angled TAB strips 36 and 38. Connection points on each of the angled TAB strips are connected to column electrodes of the LCD display by means of flexible wire looms 40 and 42 respectively. It may be noted that in the presently described embodiment, the distance L1 along the TAB strip 36 is equal to the distance L1 along the column electrodes to which it is connected by wire loom 42. Accordingly the distance between the column electrodes is maintained as the distance between contacts on the TAB strip which may be desirable in some circumstances. The arrangement is identical in respect of the left hand TAB strip 38 which has a length L2=L1.

Figure 4:
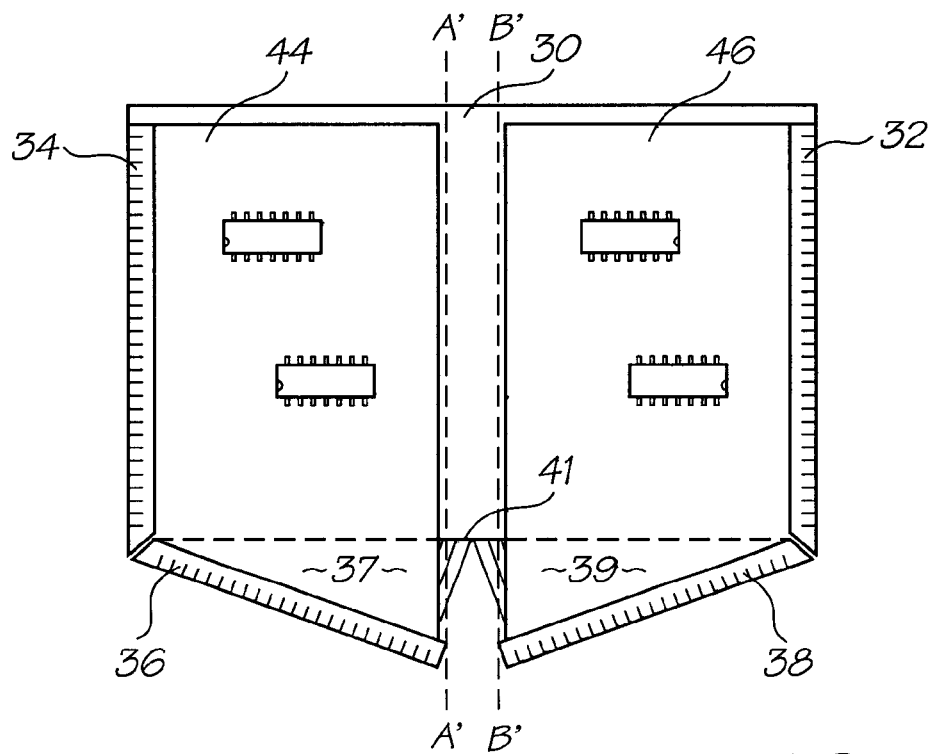
FIG. 4 is a plan view of the rear of a display assembly according to an embodiment of the present invention.

FIG. 4 shows a rear view of the display of FIG. 3 with PCBs 44 and 46 attached to the folded over TAB strips 32–38. It will be noted that there is sufficient width in the longitudinal region of the screen, defined by edges A–A' and B–B', of the PCBs for the display to be curved or folded on itself without creasing. The bottom edge 41 of screen 30 along with edge A–A' of PCB 46 and TAB film 38 define a right triangle 39. Similarly triangle 37 is defined by edge B–B' of PCB 44 and TAB film 36.

Figure 5:
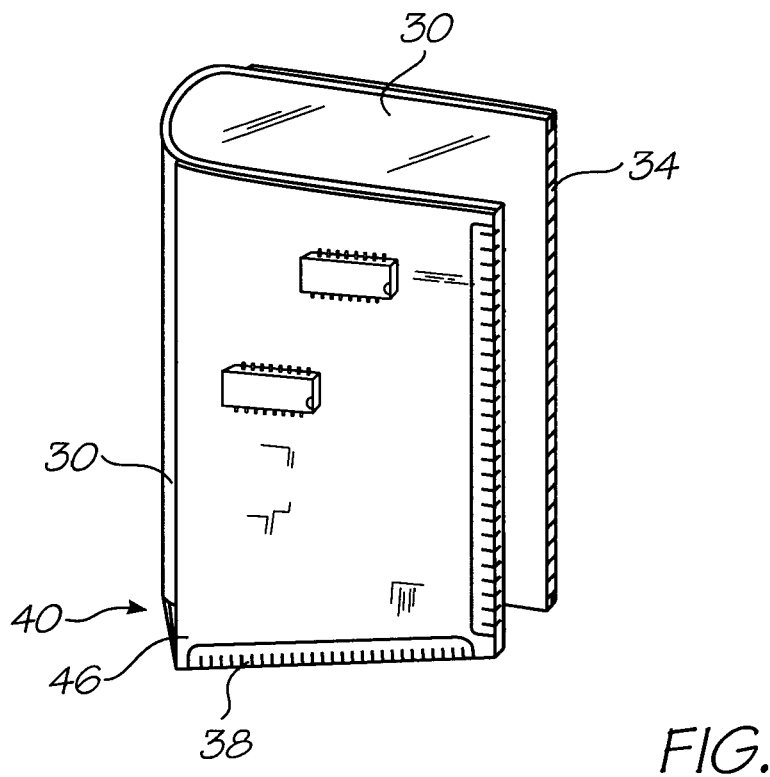
FIG. 5 is a perspective view of an assembly according to an embodiment of the present invention in a compact configuration.
Figure 6:
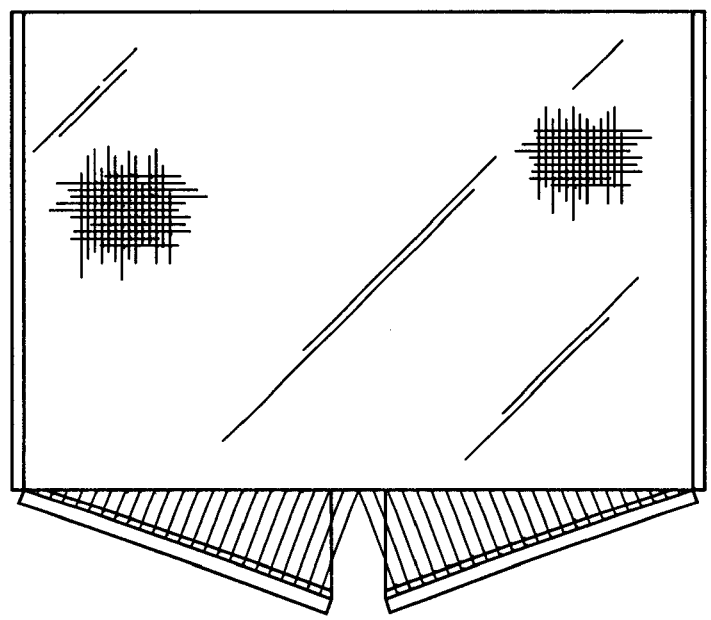
FIG. 6 is a plan view of an assembly according to an embodiment of the present invention in a display configuration.

The display assembly is shown curved upon itself to a compact configuration in FIG. 5. Upon folding the screen as shown in FIG. 5 the wires connecting column electrode connection points in the region between lines A–A' and B–B' (FIG. 3) to TAB strips 36 and 38 tighten. Accordingly a degree of slack must be present in those wires of looms 40 and 42 when the assembly is in an open configuration as shown in FIG. 6.

Figure 7:
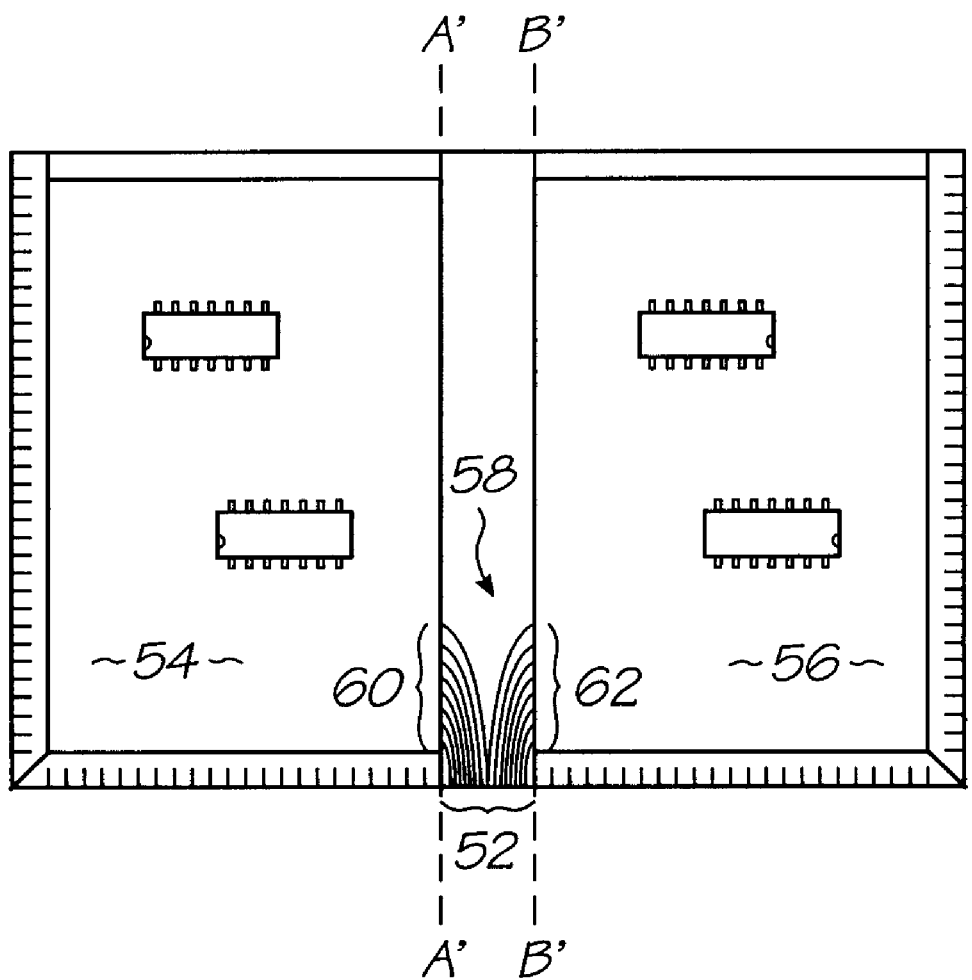
FIG. 7 is a plan view of the rear of a display assembly according to a further embodiment of the present invention in a compact configuration.

Computational devices such as laptop computers, electronic books and the like may be designed with a hinged or otherwise folding housing to incorporate the display assembly thereby facilitating formation of a compact device. A further embodiment of the invention is depicted in FIG. 7. FIG. 7 shows the rear of a display assembly in which the PCBs 54 and 56 do not project from the bottom of the screen. Rather column electrode connection points 52 in the region between A–A' and B–B' are connected to connection points 60 and 62 on the inner edges of PCBs 54 and 56 by flexible connectors 58.

Variations of the invention other than the embodiments that have been described with reference to FIGS. 3–7 are of course possible. For example other types of flexible display screen may be used such as an organic light emitting diode screen. Furthermore, the connection between the electrode contacts and the angled TAB films 38, 36 (FIG. 4) might be made by means other than wire looms. For example a flexible film having conductive traces upon it might be used to make the connections. Although the preferred embodiment has two printed circuit board defining a longitudinal flexing region of the screen it would also be possible to construct embodiments of the invention with other numbers of circuit boards.

While a preferred embodiment of the present invention has been described in detail herein, it should be clearly understood that many variations and/or modifications of the basic inventive concepts herein taught, which may appear to those skilled in the present art will still fall within the spirit and scope of the present invention as defined in the appended claims.

I claim:

1. A flexible display assembly including:

a flexible display screen having a plurality of connection points and having edges;

at least two printed circuit boards (PCBs) having edges, said PCBs located at the rear of said screen and defining a longitudinal region of the screen therebetween;

flexible connectors between connection points located in said longitudinal region and each of the PCBs; and triangles defined by an edge of the screen and edges of the PCBs;

wherein the flexible connectors are of sufficient length to accommodate closing of the assembly about the longitudinal region.

2. An assembly according to claim 1, wherein said triangles are right triangles, each of said triangles having a hypotenuse, wherein said flexible connectors terminate along said hypotenuses.

3. An assembly according to claim 2, wherein each of the hypotenuses has a length and said display screen has a length, and wherein said PCB's are shaped so that the sum of the lengths of said hypotenuses is equal to the length of said display screen.

4. An assembly according to claim 1, wherein said flexible connectors terminate along the edges of said PCBs.

5. An assembly according to claim 1, wherein said screen comprises a flexible liquid crystal display.

6. An assembly according to claim 1, wherein said screen comprises an organic light emitting diode display.

* * * * *